United States Patent [19]
Aleite et al.

[11] 3,930,936
[45] Jan. 6, 1976

[54] NUCLEAR REACTOR

[75] Inventors: Werner Aleite; Erich Klar; Hans-Gerd Spillekothen, all of Erlangen, Germany

[73] Assignee: Siemens Aktiengesellschaft, Munich, Germany

[22] Filed: Apr. 24, 1973

[21] Appl. No.: 353,999

[30] Foreign Application Priority Data
May 8, 1972   Germany............................ 2222432

[52] U.S. Cl................................................ 176/19 R
[51] Int. Cl.²...................................... G21C 17/00
[58] Field of Search....... 176/15, 19 R, 19 J, 19 EC, 176/26

[56] References Cited
UNITED STATES PATENTS
3,565,760   2/1971   Parkos et al. ...................... 89/19 R

*Primary Examiner*—Stephen C. Bentley
*Attorney, Agent, or Firm*—Kenyon & Kenyon Reilly Carr & Chapin

[57] ABSTRACT

A nuclear reactor has a reactor core and is provided with means for determining the flux density in this core, including flux detectors located in the core at fixed positions and flux probes which are movable in the core through a range of positions. Means are provided for causing the movable flux probes to go into operation automatically when the fixed flux detectors are actuated by flux densities of predetermined values.

4 Claims, 2 Drawing Figures

NUCLEAR REACTOR

BACKGROUND OF THE INVENTION

This invention relates to a nuclear reactor having a reactor core and means for determining the flux density in this core and which includes flux detectors located in the core at fixed positions and flux probes which are movable in the core through a range of positions.

The fixed flux detectors are usually used for the control of the reactor, particularly to quickly shut down the reactor in the event excessive flux densities are detected. These fixed detectors are capable of supplying continuous measurement data concerning the core flux density and possibly other values. The number and distribution of these fixed flux detectors are limited by expense.

When the more thorough investigation of the flux densities existing throughout the reactor core is desired, the movable probes are used. For this purpose a relatively large number of tubes extend throughout the reactor core and the movable probes are pneumatically driven into and from the core via these tubes, measurements of the probes after they have left the reactor core permitting the flux density measurements. Because the probes are movable, it is possible to obtain measurements from many more locations in the core than is possible by means of the fixed detectors.

One example of a system using movable probes is the U.S. Weissmann et al. U.S. Pat. No. 3,263,081, dated July 26, 1966. In this patent the probes are spherical pellets. Other forms of such movable probes are available, an example being a tightly coiled helical steel spring of substantial length and having outwardly projecting solid spherical end members, the spring being flexible so it can negotiate turns in tubes, and while in the straight tube portions within the reactor, being a probe of substantial length and which is solid, whereas a string of spherical pellets representing a corresponding probe length, risks lengthwise discontinuities because of possible separation of the pellets from each other.

This spring type of probe is disclosed and claimed by the U.S. Fracke et al. application Ser. No. 277,551 filed Aug. 3, 1972 and issued June 25, 1974 as U.S. Pat. No. 3,819,946.

Although the movable probes provide a more extensive spatial exploration of the flux densities in the reactor core, it has heretofore been usual to put them into operation only according to a definite program, for instance, at intervals of days or fractions of days. The probes are subjected to measurements prior to being introduced into the core, and after they are withdrawn from the core. The result is a discontinuous, intermittent flow of measurement data. However, the results obtained from the more extensive spatial measurements the movable probes make possible, is of particular value in the event of abnormal operating conditions within the reactor core. However, such as in case of danger, such more desirable coverage has not been obtained, unless by accidental coincidence of their programmed operation.

SUMMARY OF THE INVENTION

One object of the present invention is to obtain the benefits of the measurements obtainable only by the movable probes, with their greater spatial coverage, positively at a time when abnormal conditions exist in the reactor core, particularly when dangerous conditions exist, but without substantially increasing costs, either initially for installation or during operation of the reactor.

According to this invention, the above object is attained by providing means for moving the movable probes automatically in response to actuation of the fixed detectors by flux densities of predetermined values. Preferably one of these values is lower relative to another with such operating means made responsive to actuation of either of the detectors set for operation at these different values, independently of the other value. This provides a safety factor because if the detector set for the lower value, such as might indicate the beginning of an abnormal condition, fails for any reason, the other detector set for the higher value, such as might indicate more potential danger, should operate, whereupon the movable probes are automatically put into operation.

Ordinarily the fixed detectors are part of a control system effecting a fast shutdown of the reactor in the event of excessive flux densities or possibly other trouble, they being continuous in their operation. In addition, with this invention, they automatically put the movable probes into operation throughout at least one measuring cycle, thus providing at the precise time of trouble, a collection of measurement data as extensive as would have been obtained during normal reactor operation when the movable probes were operated in accordance with their normal fixed schedule of intermittent operation.

With the movable probes operating via the usual pneumatic tubes, the pneumatic valves that control their operation may be electrically actuated, the fixed detectors ordinarily providing electric transmission of their data, the means previously referred to therefore being provided by an electric circuit arrangement put into action by the signals obtained from two or more of the fixed detectors, and providing an output actuating the electrically controlled pneumatic valves. Upon actuation of the pneumatic valves, the probes circulate into and from the reactor core via the tubes, and the electric arrangement should be such that the pneumatic valves are controlled to limit the probe circulation to one cycle to avoid continuous recycling. Provision can be made for manual operation of the pneumatic valves so that the movable probes can be used in the same manner as has heretofore been customary.

BRIEF DESCRIPTION OF THE DRAWINGS

A preferred form of the invention is illustrated by the accompanying drawing, in which.

DESCRIPTION OF THE PREFERRED EMBODIMENT

Figure 1:
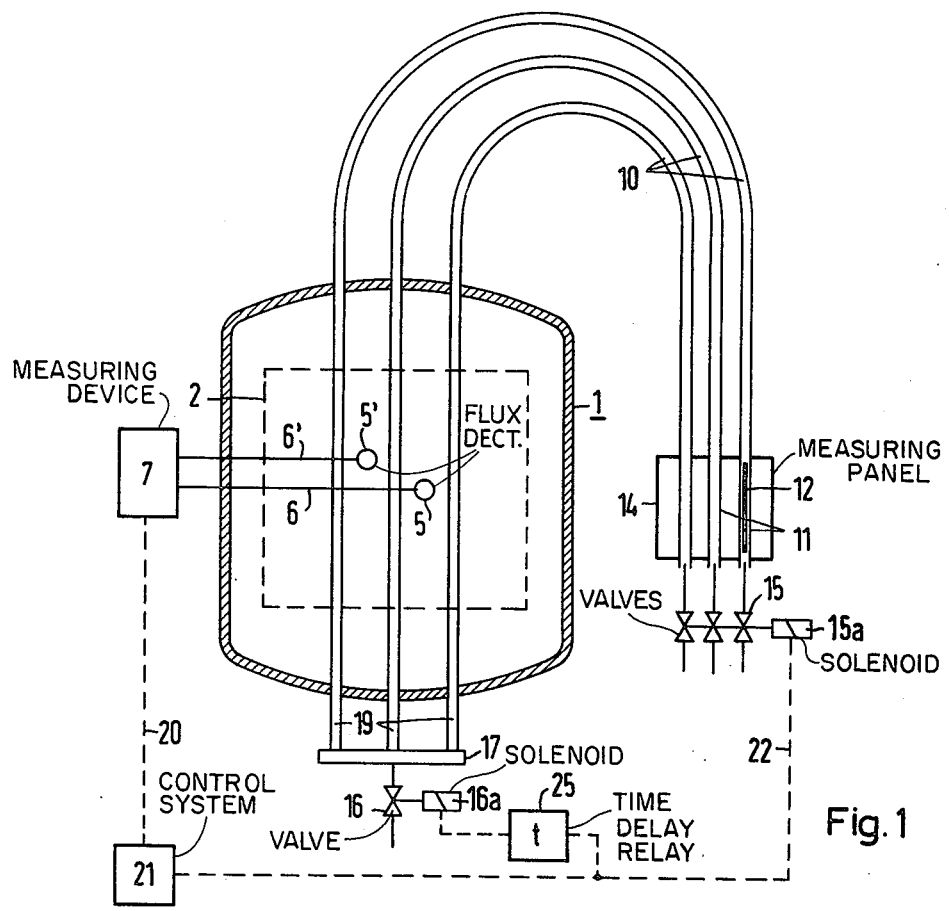
FIG. 1 schematically illustrates the invention with the reactor pressure tank shown in vertical section.

Having reference to the above drawings, a nuclear reactor pressure tank 1 contains a reactor core 2, indicated by dashed lines. The reactor may be a pressurized-water power reactor having a capacity of 200 or more MWe, in which case the fixed detectors, of which only two are shown at 5 and 5', for measuring the neutron flux data, may in the aggregate comprise some 20 to 50 fixed detectors distributed throughout the reactor core 2 at fixed locations. Even so, the spatial coverage cannot equal that obtainable by the movable probes.

The two fixed probes 5 and 5' are represented as being electrically connected in the usual manner via lines 6 and 6', respectively, to the usual measuring device 7 which customarily provides electric signals for the operation of recorders, and when necessary, to automatically shut down the reactor.

For the movable probes a system of pipes 10, of which only three are shown, extend throughout the core 2 through the pressure tank 1 and to measuring tube portions 11 on the outside of the reactor, these tubes containing the movable probes 12, of which only one is shown. These probes may be of any of the known types, but preferably the coil spring form is preferred as previously indicated. At the measuring tube portions 11 a flux density measuring panel 14 is shown where prior art measuring devices are located to measure the degree of activation of the probes 12.

To move the movable probes 12, pneumatic valves 15 introduce gas under pressure to the outside ends of the tubes 10, the probes 12 being slidable within these tubes and being designed to receive the driving force from the gas. Thus, the probes 12 are driven through the tube 10 and the reactor core 2, a valve 16 connected with a branch connection 17 and so to the other ends 19 of the tubes, serving when opened to introduce gas under pressure to the tubes to drive the probes 12 back to the measuring tube portions 11 at the measuring panel 14. The valves 15 and 16 are designed in accordance with known pneumatic engineering to vent to the atmosphere when required, so that when the valves 15 are opened, the probes 12 are driven to the desired measuring positions; and when the valve 16 is opened and the valve 15 closed, the probes are driven back to the location of the measuring panel 14. The residence time of the probes at their various positions within the reactor core is usually a maximum of a few minutes.

The valves 15 and 16 are shown as being operated by solenoids 15a and 16a, respectively. The measuring device 7 is shown by the dashed line 20 as being functionally connected to an electrical control system 21 which is, in turn, functionally associated with the solenoids 15a and 16a, this being indicated by the dashed lines 22, the solenoid 16 being worked through a time delay relay indicated at 25. The two fixed detectors 5 and 5' and their associated measuring device 7 transmit the two signals which represent the higher and lower flux densities measured by these two detectors to the system 21. The latter is independently actuated by either of these values, providing desired safety factors, and when actuated, send a signal energizing the solenoid 15a which moves the probes 12 rapidly into the reactor core 2 where they remain for a time fixed by a time delay relay in the system, the time delay relay 25 preventing actuation of the valve 16 during this time. When the time delay relays time-out, the valves 15 are closed with venting and the valve 16 is opened, whereupon the probes are returned to their starting position, ready for measurement via the instrumented panel 14. To explain further, while the valves 15 are opened, the valve 16 vents to the atmosphere; and when the valves 15 close, and the valve 16 opens, the valves 15 vent to the atmosphere; all valves being supplied with gas under pressure. Such details involve only well-known pneumatic engineering principles.

It was previously mentioned that there may be some 20 to 50 of the fixed detectors 5, 5', etc. These are the continuously operating measuring devices located at fixed positions in the reactor core, of which only two are illustrated. Ordinarily the settings would be such that one detector, via the measuring device 7, sends the signal to the arrangement 21 as a dangerous condition is beginning to develop, and the other one sends a signal when the dangerous condition is more closely approached or is attained. If the arrangement is such that the reactor is then shut down, the movable probes have gone through their measuring cycle and are available to provide a detailed analysis of the conditions existing when the shutdown occurred. To show the value of the invention, the movable probes 12 in a reactor having the capacity previously indicated, may cover from fifteen to thirty times the number of measuring points that are occupied by the fixed detectors.

Figure 2:
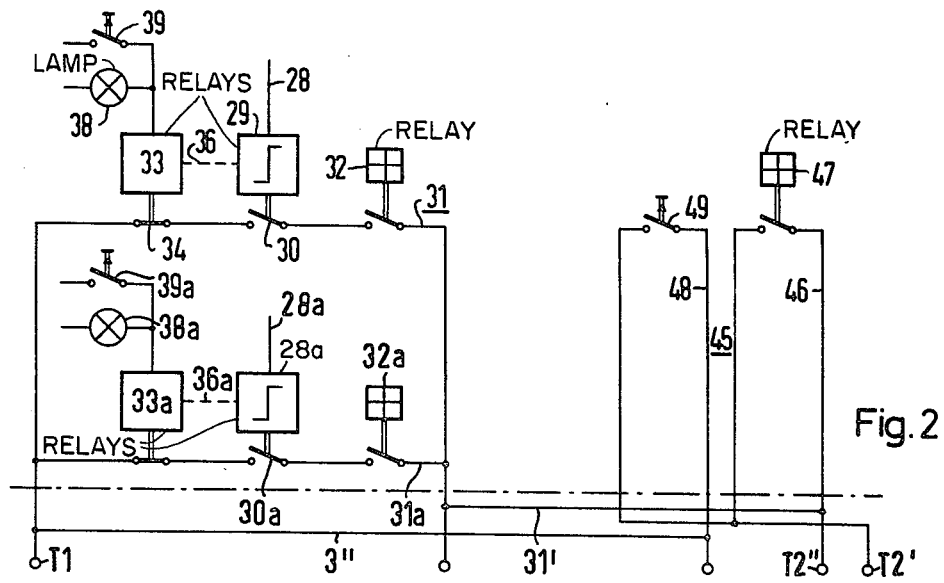
FIG. 2 diagrammatically shows control circuitry.

Referring now to FIG. 2, which diagrammatically shows a possible control to effect the operation described above, the lines 28 and 28a carry the two signals from the measuring device 7, as indicated in FIG. 1 by the functional dashed line 20. The lines 28 and 28a are associated with corresponding components shown in the diagram at upper and lower levels, the corresponding parts being correspondingly numbered with the lower level elements identified separately by the letter a. It is considered appropriate to refer in the following to only the upper level of components.

The line 28 connects with a relay 29 which closes its contact 30 when a signal is received via the line 28, the contact 30 controlling a circuit 31. A relay 32 is shown for the purpose of permitting this circuit 31 to be manually opened, the contact of this relay 32 being normally closed. A time delay relay 33 has normally closed contacts 34 which also control the circuit 31. The relay 29 is indicated by the dashed line 36 as functionally related with the relay 33, so that when a signal is received via the line 28, and the contacts 30 close, the relay 33 is actuated to time-out after a predetermined set time, and open its normally closed contacts 34. Simultaneously the signal lamp 38 is lit, a switch 39 being provided so that when appropriate, the relay 33 may be reset, this extinguishing the lamp 38. Because the upper and lower levels of components in FIG. 2 are in parallel, the desired safety factor is maintained. In other words, if the lower flux level signal is transmitted from the measuring device 7 to the line 28 and the upper level components fail to operate for any reason, subsequently when the device 7 sends the higher flux level signal via the line 28a, presumably indicating a close approach to a dangerous condition in the reactor core 2, the lower level components have an opportunity to operate. The two levels of components are entirely independent of each other as are, of course, the two fixed detectors 5 and 5', and the circuitry in the measuring device 7 is designed to maintain this independency.

Operation of either level of components closes the circuit from a terminal T1 to a terminal T2' which is connected to the solenoid 15a and the relay 25 as their controlling circuits, the connections being indicated by the dashed line 22.

The predetermined time at which the relays 25 and 33 time-out is fixed by the time it is known to take for the probes 12 to move to their pickup positions and stay there for the required time. The initial signal simultaneously starts the operation of the time delay relays 25 and 33, both set for a corresponding time, the relay 25 having normally open contacts. With the valve 16 venting, the valve 15 now opens for this predetermined time; when the relays time out, the contact 34 opens and deenergizes the circuit 31 and therefore the terminal T2' to which the circuit 31 connects via a line 31', thus causing the valves 15 to close and vent the tubes. At this time the relay 25 also times out and with the valves 15 now venting, the solenoid 16a is actuated to open the valve 16 and effect the return of the probes 12. When the solenoid 33 times out, the contact 34 remains open to prevent recycling or repetitious movement of the probes 12, they remaining at the measuring panel 14.

The lines 31 and 31a connect by the line 31' through an arrangement 45 providing for the line 31' to connect with the terminal T2' via a circuit loop 46 controlled by the contact of a solenoid 47, it being necessary for this contact to be closed to effect the operation previously disclosed. When the contact of the relay 47 is open, the actuation is locked out. A second terminal T2'' may also be connected with the solenoid 15a, the terminal T1 being connected with the terminal T2'' via a line 31'' and a circuit loop 48 controlled by a manually operated switch 49. With this arrangement, when the relay 47 is operated to open its normally closed contact, the switch 49 may be used to manually actuate the movable probes independently of the automatic actuation under the control of the fixed detectors 5 and 5'.

It can be seen from the foregoing that very little expense is involved by the present invention. The fixed detectors and the movable probe and their actuating arrangements already exist in the case of an operative nuclear reactor. It is only necessary to pick up the two, or possibly more, signals from the measuring device 7 and which represent the relatively higher and lower flux measures desired for operation of the movable probes automatically. The additional circuitry required is simple and inexpensive.

What is claimed is:

1. A nuclear reactor having a reactor core and means for determining the flux density in this core and including flux detectors located in the core at fixed positions and flux probes which are movable in the core through a range of positions; wherein the improvement comprises means for moving said movable probes automatically in response to actuation of said detectors by flux densities of predetermined value, one of said values being lower relative to another and said operating means being responsive to actuation of said detectors by either of these values independently of the other value.

2. A nuclear reactor having a reactor core and means for determining the flux density in this core and including flux detectors located in the core at fixed positions and flux probes which are movable in the core through a range of positions; wherein the improvement comprises means for moving said movable probes automatically in response to actuation of said detectors by flux densities of predetermined values, said movable probe moving means having an electrical controller and said fixed-positioned detectors producing an electric actuating signal transmitted to said controller, and means for terminating said signal to said controller after a probing movement of said probes to prevent repetitious probing movements of the probes.

3. The reactor of claim 2 having means for manually activating said actuating signal.

4. The reactor of claim 2 in which said probing movement requires a known time period for completion and said terminating means is automatically responsive to said time period.

* * * * *